United States Patent Office.

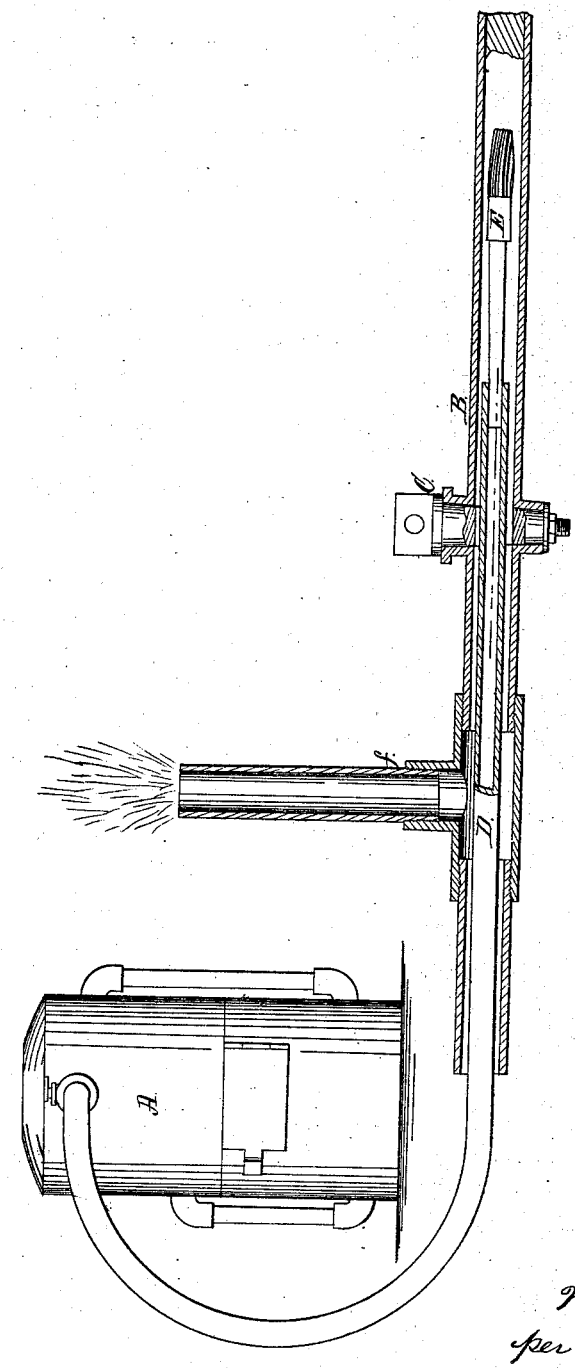

WILLIAM YOUNG, OF EASTON, PENNSYLVANIA.

Letters Patent No. 77,857, dated May 12, 1868.

IMPROVEMENT IN DEVICE FOR CLEARING PIPES.

The Schedule referred to in these Letters Patent and making part of the same.

TO ALL WHOM IT MAY CONCERN:

Be it known that I, WILLIAM YOUNG, of Easton, in the county of Northampton, and State of Pennsylvania, have invented a new and useful Improvement in Device for Thawing out Frozen Water-Pipes, &c.; and I do hereby declare that the following is a full, clear, and exact description thereof, which will enable those skilled in the art to make and use the same, reference being had to the accompanying drawings, forming part of this specification.

The object of this invention is to provide means for readily thawing out the ice in water-pipes when they become unserviceable from freezing, and also to be used for other purposes of a similar nature.

And the invention consists in the application of steam for that purpose, in the manner hereinafter described.

The drawing represents the apparatus applied to the purpose of thawing out a water-pipe.

A is a portable steam-generator, for which I have already received Letters Patent of the United States, which, in this application, requires no particular description.

B represents an ordinary water-pipe, for supplying families from the water-"main."

C represents the stop-cock in the water-pipe, which is usually placed beneath the sidewalk.

When this service-pipe becomes frozen and obstructed by solid ice between the "main" and where it enters the house, as it frequently does in cold and freezing weather, it is usual to take up the pipe by digging through the sidewalk and frozen ground, or to build fires over the pipe, with a view of thawing it out, all of which methods involve an immense deal of trouble and vexation.

In making an application of my invention for that purpose, I remove a portion of the water-pipe, and insert a small tube or steam-pipe, which is connected with the generator A.

This steam-pipe is marked D, with the end shown in section.

E is a long-shanked tubular reamer, which is attached to the end of the steam-pipe, and which it is necessary to use on some occasions in passing through the orifices in the water-cock C, as the orifice through the cock is sometimes obstructed by rust.

But, this cock being within reaching distance, whenever the end of the reamer strikes an obstruction, the reamer can be turned round from the shank-end, and such obstruction be removed, and a free passage-way opened.

A current of steam is all the time discharging from the end of the reamer, a portion of which steam will not be condensed, but return around the outside of the reamer and pipe, and be discharged from the vertical tube $f$, or from the end of the pipe where the steam-pipe is inserted.

As the ice melts away before the steam-jet or current, the steam-pipe is pushed forward, so as to follow up the solid ice till the obstruction is removed.

A small metallic pipe is employed, which possesses sufficient flexibility for the purpose.

The ordinary water-service pipe is only about three-fourths of an inch in diameter; consequently my steam-pipe is only sufficiently large in diameter to convey a jet or current of steam one-eighth of an inch in diameter, that being found sufficient for the purpose.

The application of the steam-jet to the ice in the frozen pipe very soon melts the ice, and rapidly overcomes the difficulty.

With the portable steam-generator, and the insertion of the small steam-pipe into the frozen pipe, the business of relieving distressed housekeepers of the frozen-water-pipe trouble is reduced to a system, the remedy being rapid and effectual.

I claim as new, and desire to secure by Letters Patent—

The arrangement of the tubular reamer E with the steam-pipe D, substantially as set forth.

The above specification of my invention signed by me, this 16th day of March, 1868.

WILLIAM YOUNG.

Witnesses:
   BEATES R. SWIFT,
   N. D. HOYT.